(12) United States Patent
Morton

(10) Patent No.: US 9,959,722 B1
(45) Date of Patent: May 1, 2018

(54) METHODS FOR DETERMINING PATTERNS OF PRESENCE AND OWNERSHIP OF MOBILE DEVICES BY INTEGRATING VIDEO SURVEILLANCE WITH SMARTPHONE WIFI MONITORING

(71) Applicant: Steven Gregory Morton, Oxford, CT (US)

(72) Inventor: Steven Gregory Morton, Oxford, CT (US)

( * ) Notice: Subject to any disclaimer, the term of this patent is extended or adjusted under 35 U.S.C. 154(b) by 37 days.

(21) Appl. No.: 14/983,151

(22) Filed: Dec. 29, 2015

Related U.S. Application Data

(63) Continuation of application No. 14/217,797, filed on Mar. 18, 2014, now Pat. No. 9,286,776.

(51) Int. Cl.
| | | |
|---|---|---|
| *H04N 7/14* | (2006.01) | |
| *H04N 7/18* | (2006.01) | |
| *G08B 13/196* | (2006.01) | |
| *H04L 29/12* | (2006.01) | |
| *H04M 11/04* | (2006.01) | |
| *H04W 36/00* | (2009.01) | |

(52) U.S. Cl.
CPC ... *G08B 13/1966* (2013.01); *G08B 13/19665* (2013.01); *H04L 61/6022* (2013.01)

(58) Field of Classification Search
CPC .......... H04N 7/14; H04N 7/18; H04M 11/04; H04M 1/725; H04M 1/663; H04W 36/00
USPC .............. 348/156, 143, 152, 158, 14.01; 455/404.2, 412.1, 412.2, 437; 386/239, 386/248
See application file for complete search history.

(56) References Cited

U.S. PATENT DOCUMENTS

2011/0235591 A1* 9/2011 Iyer ................ H04L 5/0064 370/328

* cited by examiner

*Primary Examiner* — Daquan Zhao

(57) ABSTRACT

A method is described for using a surveillance system to covertly and automatically determine the presence of persons and machines that do not want to be tracked and whose identities are unknown. Video is provided by one or more surveillance cameras and recorders to assist in visually distinguishing bearers of WiFi-equipped mobile devices. A processing device covertly receives WiFi probes from mobile devices, particularly smartphones, and forms and sends messages with links for viewing relevant live and recorded video. The processing device processes WiFi information, particularly mobile device signatures known as WiFi MAC addresses, organizes and records MAC addresses and other information, analyzes patterns of previous presence of MAC addresses using a variety of parameters, adjusts its processing parameters, determines when the reception of WiFi information from particular mobile devices satisfy criteria for sending messages, and presents its analysis for review and collaboration.

10 Claims, 13 Drawing Sheets

Figure 3c

309 — Check signal strength and if in a certain range, open the MAC-named file for the current MAC address, read a number of the most recent probes, remove too close ones, format a Strong Signal Detected message in HTML with: time in human readable format, timestamp, signal strength, and URL of a video-aware portal, with the time code of each probe and a hostname or other identifying name encoded in the URL, for each of the current and previous probes, and send an alert that is viewable formatted to a list of users from 308

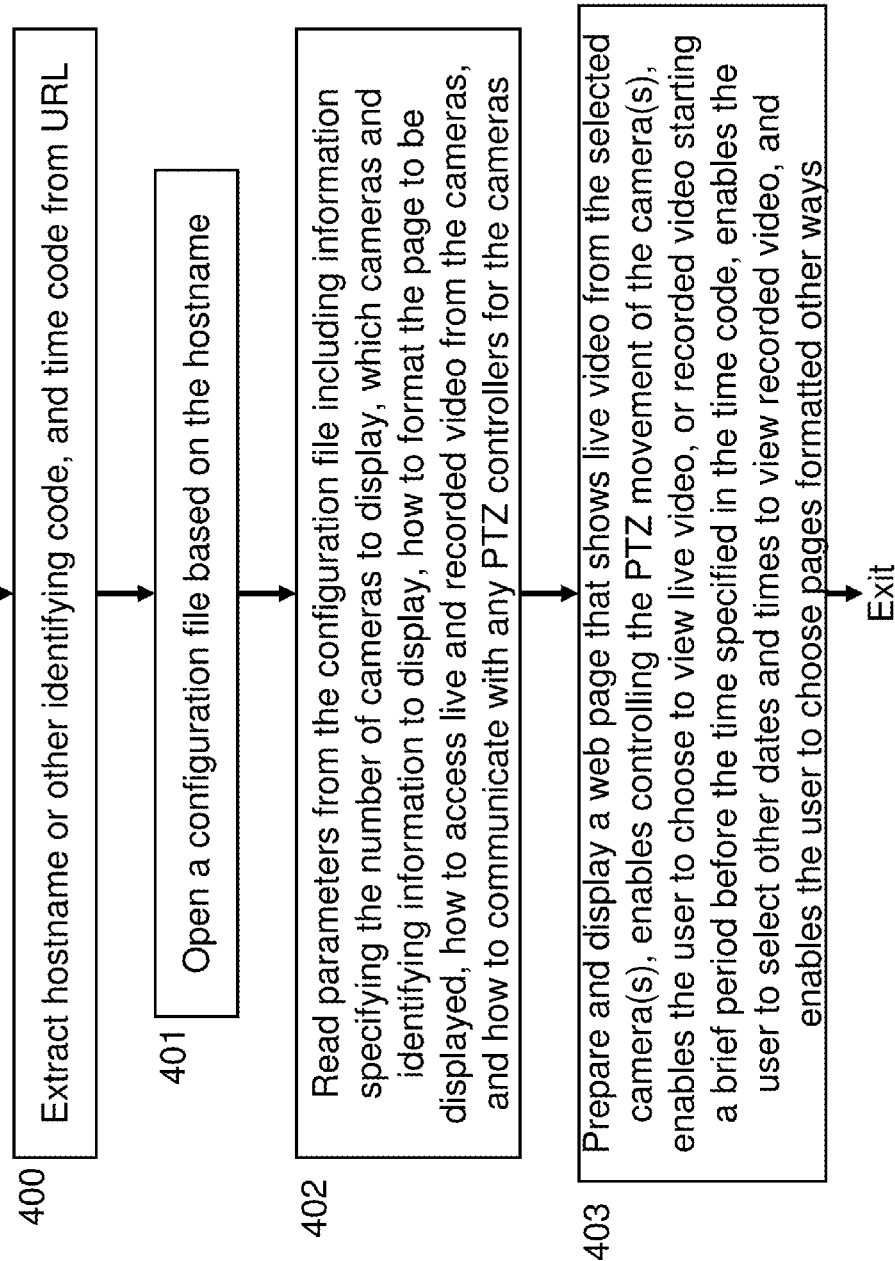

METHODS FOR DETERMINING PATTERNS OF PRESENCE AND OWNERSHIP OF MOBILE DEVICES BY INTEGRATING VIDEO SURVEILLANCE WITH SMARTPHONE WIFI MONITORING

DRAWINGS

FIG. 1. System block diagram of preferred embodiment of this invention

FIG. 2. Block diagram showing antenna receiving area and camera field of view according to this invention FIGS. 3a to 3e. Flowchart of video-aware, WiFi monitoring program, according to this invention FIG. 4. Flowchart of video-aware, web page formatting program, according to this invention FIG. 5. Graphic view of video-aware, e-mail for Smartphone on Watch List Detected alert, according to this invention FIG. 6. Screenshot of view in browser of live surveillance video, according to this invention FIG. 7. Screenshot of view in browser of recorded surveillance video, according to this invention FIGS. 8a to 8b. Flowchart of program for analyzing data base of WiFi probes, according to this invention

PROGRAM LISTINGS

Listing 1. text of HTML-formatted e-mail for Smartphone on Watch List Detected message, according to this invention

CROSS-REFERENCE TO RELATED APPLICATION

This patent application is a continuation of, and claims the benefit of, the co-pending patent application, "Methods and apparatus for determining patterns of presence and ownership of mobile devices by integrating video surveillance with smartphone WiFi monitoring," filed Mar. 18, 2014, Application Ser. No. 14/217,797, by the inventor named herein. That earlier patent application claims the benefit of the provisional patent application, "Methods and Apparatus for Spotting Patterns of Presence that Humans Can't See by Combining Outdoor Video Surveillance with Smartphone WiFi Monitoring," filed Mar. 19, 2013, as U.S. patent application No. 61/803,127, EFS ID 15293887, confirmation number 8706, also by the inventor named herein.

FIELD OF THE INVENTION

This invention relates generally to methods and systems for determining the past and current presences of persons whose identities are unknown, at particular locations, and who do not participate in determining their location because they do not want their locations known. More specifically, it relates to methods for using video surveillance systems and systems for monitoring WiFi and other wireless transmissions by mobile devices, particularly smartphones. This invention is intended to provide methods for using outdoor surveillance systems that automatically determine the past and current presences of persons whose identities may be unknown, and assist in the determination of the identity of those persons, for the purposes of law enforcement, homeland security, public safety, and combating theft and vandalism.

BACKGROUND OF THE INVENTION

I made this invention in response to talking to users of outdoor video surveillance systems. The comments I kept hearing were that it's good to have images but no one has the time to constantly watch video looking for suspects, no one can remember enough of what they see to spot patterns in the presence of subjects, and they need help identifying the individuals.

The key questions are:
1) How does one determine when particular individuals are present, or if anyone is present ?
2) How does one determine if anyone was present previously, and if so, who ?
3) How can one put a name to a face ?

The de-facto solution is video surveillance, but monitoring video from cameras, especially outdoor ones, to spot suspects is a daunting task. Humans lack the time to continuously watch surveillance video. They lack the memory to remember every person and vehicle and when they came and went during recent days or weeks, and spot patterns in this mountain of information. Distance, darkness, glare and vehicles conceal identities. Motion sensors that call your attention to video are useless with a busy street. Face recognition doesn't work at a distance or when you can't see a person's face well. Video analytics don't help when activity looks normal, and they don't determine identities. Tracking mobile phone numbers only works if you know which numbers to look for. Fighting terrorists and a multitude of crimes suffers.

I'm trying to answer simple questions:
1) has a particular person ever been present at a particular location during a particular period of time ?
2) when were they present ?
3) who was with them ?
4) how far was the person from the observation point ?
5) is that person there now ?
6) how can one be alerted when that person, or anyone, arrives ?
7) what do they and their vehicle, if any, look like ?
8) how can one associate a physical presence with a particular mobile device ?
9) how can one verify that the same person is carrying a particular mobile device ?
10) how can one electronically obtain enough information about a person whose identity is unknown to have probable cause and get a court order to compel the provider of a particular smartphone to identify its owner and provide other personal information about the mobile device ?

Systems that monitor WiFi probes sent by mobile devices to find nearby WiFi hotspots are well known. Non-Patent Citations 1 through 5 give some articles on the subject. These systems are intended for retail applications to estimate foot traffic, determine when and where shoppers congregate and for how long, and determine the location of a cooperating subject and send immediately relevant advertising literature to that shopper. By a cooperating subject, I mean one who purposely makes the WiFi MAC address of his/her mobile device known to those who want it. While it is common to have surveillance cameras on streets and in stores, they and their recording devices are incidental to and not integrated with the WiFi monitoring systems.

In contrast, this invention is intended for outdoor law enforcement and public safety applications where persons do not want their locations and identities known. Since mobile devices can be shared and WiFi probes from mobile devices identify only the mobile device, not the bearer, this invention helps attach physical identity to the bearer of a mobile device via live and recorded video of the current and past presences of mobile devices. Since WiFi probes are sent by smartphones relatively infrequently, typically once every minute or two, and can be received outdoors from many mobile devices within one hundred yards of a receiver, one cannot easily determine which individual is associated with which mobile device. This ambiguity can be reduced by analyzing which mobile devices are present over time, and by reviewing recorded surveillance video from those multiple times to determine the recurring presence of certain individuals. Thus the ability to easily view multiple segments of recorded video from cameras in the area being watched is essential. And, the ability to enter the smartphone signatures, known as WiFi MAC addresses, of mobile devices of interest into a list that triggers the immediate sending of an alert that a particular mobile device is present, and enables viewing live and recorded video that is relevant to that particular WiFi MAC address, is essential. Law enforcement can use images of an individual committing a crime, combined with evidence that a particular mobile device is associated with that individual, to get a court to issue an order compelling the manufacturer of the mobile device to disclose the name of the owner of the mobile device, as well as information about the use of the mobile device.

While one could read the time a WiFi probe was received, manually select a video surveillance system that has one or more cameras viewing the area where WiFi probes are received, and manually enter the time into the video surveillance system to access recorded video, the process is tedious. It is not conducive to reviewing many video segments in an attempt to associate mobile devices with individuals or verifying whether or not the same person is carrying a particular mobile device.

In addition, the geographical environment of WiFi monitoring systems used for retail applications is shopping districts. In contrast, my focus is in any area where crime may be a problem. This includes residential neighborhoods where there is persistent WiFi traffic from AC-powered laptop computers and entertainment devices that access the Internet via a WiFi network. These devices, being AC-powered, often send WiFi probes every few seconds, not once every minute or two, as is common with battery-powered devices. Frequent probes are not useful and, since significant processing of probes may be required to implement filters to detect the MAC addresses of subjects' mobile devices, useless probes must be discarded early in the processing of probes so they do not overload the device receiving and processing the probes.

SUMMARY OF THE INVENTION

An objective of this invention is to determine the presence of persons whose identities are unknown. A further objective is to provide a means to associate the name of an individual with a particular mobile device to help identify those persons. The use of relevant live and recorded surveillance video is an essential part of this invention since it enables associating the image of the bearer of a mobile device with a particular mobile device, and to verify that the same person is in possession of the same mobile device.

Mobile devices, particularly smartphones, have become inseparable from many people and are being built into vehicles, eyeglasses and many common items. Every mobile device has a unique signature, analogous to a Vehicle Identification Number, called a WiFi MAC address, that is ingrained in it at the factory. This signature enables mobile devices to find nearby WiFi networks and connect to the Internet without using expensive cellular networks. The signature can be used as a proxy for the identity of the person or vehicle. It can be read wirelessly within a radius of about 100 yards outdoors using only one or more tiny concealed antennas in the receiver. It can be read regardless of weather or time of day, often even when the person or vehicle cannot be seen clearly, or the person with the smartphone is concealed inside a vehicle. The range can be much greater with proper antennas, or limited for use indoors with proper antennas or software configuration.

This document assumes that WiFi messages are detected, but is not limited to them. WiFi is convenient, compared to other technologies such as Bluetooth, simply because it has much longer range outdoors, where I expect my invention will be most often used. It can be used indoors as well.

The core system architecture consists of a video-aware device that is able to receive WiFi probes from mobile devices, particularly smartphones, process and record these probes, and determine when alerting conditions occur. Cameras and video recording devices provide visual identification of the bearers of mobile devices, and can be built into, or separate from, the WiFi receiving devices.

When an alerting condition is detected by a WiFi receiving device, the WiFi receiving device formats a message with not only information about the mobile device that triggered the alert, but also itself and one or more links to a video-aware portal that enables one or more message recipients to easily view relevant live and recorded video and other information in a timely fashion.

The video-aware portal receives a request from a message recipient who clicked a video link in a message. The video-aware portal accesses a description of information that should be provided in response to a message and from a particular WiFi receiving device, and how to access the required information, and prepares a web page for viewing the information. Live and recorded video is provided by a media server that presents video in windows in the web pages prepared and displayed by the video-aware portal.

While the system is intended primarily for outdoor use, it can be implemented in many ways for both indoor and outdoor use. In addition, the WiFi receiving device can be separate from, or in the same housing as, one or more cameras, which can have local video recording devices.

Methods for using this capability are also described.

BRIEF DESCRIPTION OF THE DRAWINGS

Note: For convenience, items in drawings are numbered according to the figure they are in. For example, item number xyz is in Figure x.

FIGS. 3a through 3e give a flowchart of my video-aware, WiFi monitoring program, according to this invention. This program runs on my WiFi Receiving Device as 101 and 102, processing WiFi probes as they are received.

FIG. 4 gives a flowchart of my video-aware, web page formatting program, according to this invention. This program runs on my Video-Aware Portal 108.

BRIEF DESCRIPTION OF THE PROGRAM LISTINGS

Listing 1 gives the text of the exemplary HTML code prepared by my video-aware, WiFi monitoring program when a smartphone on the watch list is detected, according to this invention. This text produced the graphical rendering shown in FIG. 5.

DETAILED DESCRIPTION OF THE INVENTION

Implementation of the Preferred Embodiment

Figure 1:
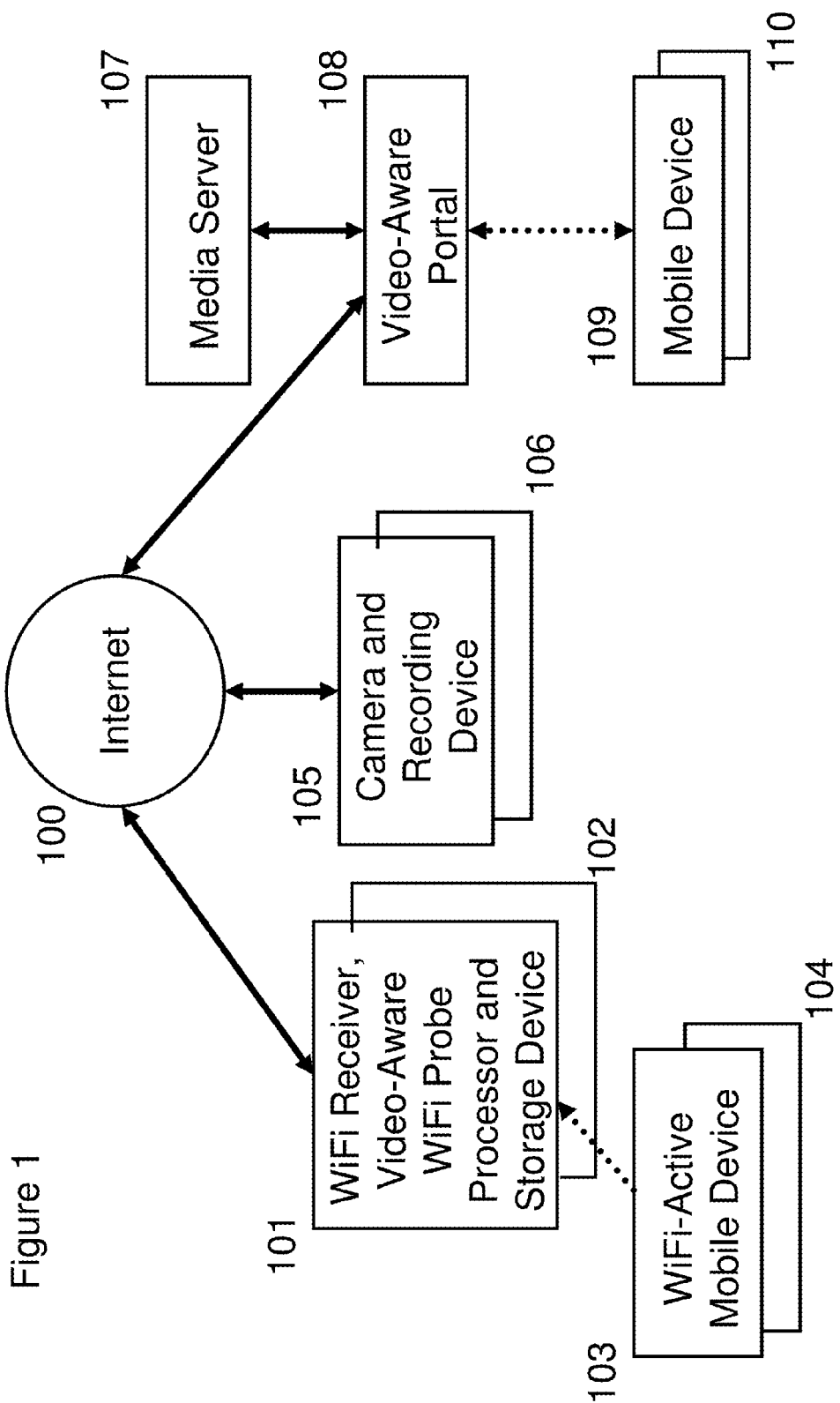
FIG. 1 shows a system block diagram of the preferred embodiment of this invention.

FIG. 1 shows a system block diagram of the preferred embodiment of this invention. All devices communicate via the Internet or other wide area network, but typical data flows are shown to focus on the flow of information through my system.

One or more WiFi Receiver, Video-Aware WiFi Probe Processor and Storage Device units, which I call the WiFi Receiving Device for short, are computing devices that are able to receive, process and store WiFi probes, form complex video-aware messages and communicate with the Internet 100 or other wide area network, are shown as 101 and 102. In Linux, information received from mobile devices by a WiFi interface is filtered by programs such as wireshark and tshark to remove user data, leaving only probes for further processing. As is known in the art, the typical output from wireshark provides a timecode, MAC address and signal strength of the probe. The MAC address, which I also call a smartphone WiFi signature herein, has two parts, one to identify the manufacturer of the mobile device, the other to enumerate devices made by that manufacturer, as is known in the art.

The flowchart for the processing performed by each of the WiFi Receiving Devices 101 and 102 is given in FIG. 3, which is in three parts. WiFi probes are received by 101 and 102 from one or more mobile devices, shown as 103 and 104, that are turned on and whose WiFi communications are enabled. As is known in the art, use of monitor mode by the WiFi receiver enables the signal strength of each WiFi probe received to be determined and avoids detection of the WiFi receiver since it does not transmit any WiFi signals. Determination of signal strength enables the distance between the WiFi receiver and mobile device to be estimated.

Mobile devices send WiFi probes with varying frequency. Many battery-powered mobile devices typically send one probe every one to two minutes, even when in one's pocket, but the time between probes can vary from several seconds to several minutes and often, not all probes are received. This complicates the association of a particular MAC address with a particular individual when many mobile devices are nearby since a person can walk a significant distance in the time between two or more probes from his or her mobile device.

Entertainment devices, such Wii's, Nintendos, Roku's and many Internet-capable DVD players, commonly found in residential neighborhoods, communicate with WiFi networks and also send WiFi probes. These AC-powered devices, as well as AC-powered laptop computers, often send WiFi probes every few seconds. These frequent and persistent probes are a nuisance and must be discarded by the WiFi Receiving Device as 101 and 102 quickly to avoid overloading it when many mobile devices are nearby.

One or more cameras and video recording devices that are able to communicate with the Internet 100 are shown as 105 and 106. These cameras are near the WiFi Receiving Device as 101 and 102 so the bearer of a mobile device whose WiFi probe has been received can usually be seen. The camera and video recording device can be in the same unit, as shown as 105 and 106, or in separate locations. The camera, video recorder, and WiFi Receiving Device all can be in the same unit, which I call a "video pod" in FIG. 5. Other combinations are possible.

Each camera as 105 and 106 produces at least one, and preferably more, different video streams, with at least different resolutions, frame rates, data rates or compression factors. These streams are recorded by the recording device. All streams can be accessed by the media server 107. The use of multiple streams enables video windows to be tailored to the screen size of the display device, and lower data rate streams to be chosen when the transmission capacity of the wide area network is low.

Figure 5:
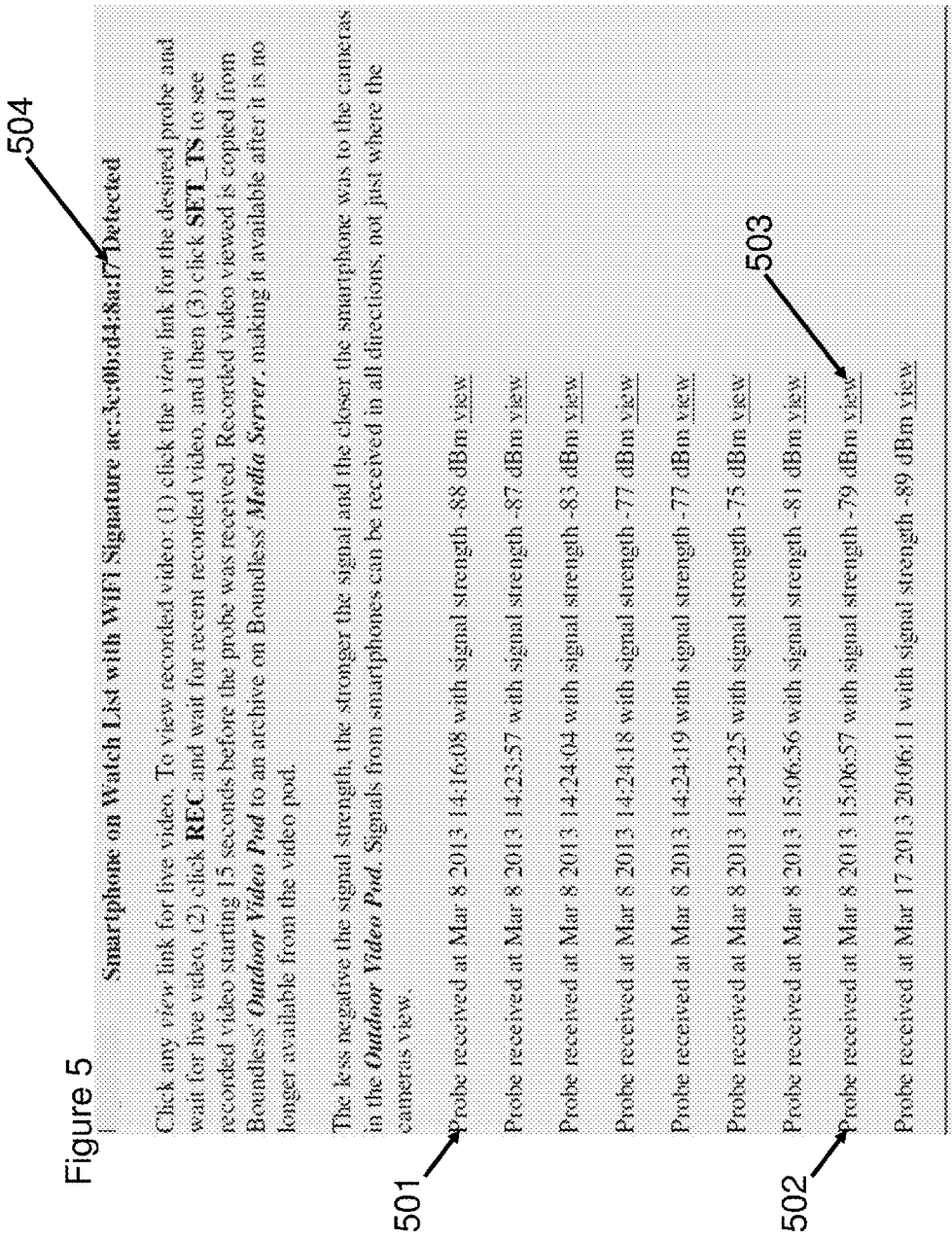
FIG. 5 gives the graphical rendering from a web browser of an exemplary HTML-formatted e-mail for Smartphone on Watch List Detected, according to this invention. This graphic view is produced by the text in Listing 1. This e-mail is created by my WiFi Receiving Device as 101 and 102.

A Video-Aware Portal that communicates via the Internet is shown as 108. The flowchart in FIG. 4 shows the processing performed by the portal when a view link 503 in a message as shown in FIG. 5 is clicked. By Video-Aware Portal, I mean a computing device that functions as a server and point of common access for the system, enabling users to access information from other parts of the system via it, and enabling users to control other parts of the system via it. By video aware, I mean it has the ability to access live and recorded video from cameras and video recorders 105 and 106 via a media server 107, another computing function that may be co-resident with the portal or separate, using whatever communications protocols are required, converting video from these devices into a format for presentation in web pages viewed on mobile devices, such as 109 and 110, by users, with whatever communications protocols are required. It also provides team-viewing, providing video to multiple users simultaneously without additional burden on the communications channel from a camera to the Internet.

The Video Aware Portal 108 also provides an e-mail server for sending messages that are sent by a WiFi Receiving Device as 101 and 102 via the VPN. This provides a common point for sending messages.

The media server 107 also archives recorded video viewed. This not only speeds viewing by subsequent viewers of that recorded video but also provides access to the recorded video after it has been overwritten on the recording device by more recent video.

The use of a media server 107 is invisible to the user because the Video Aware Portal 108 also provides a proxy server. This hides the many different and changing IP addresses used throughout the system and provides a single point of access. It also enables devices that are only accessible by the Video-Aware Portal via a VPN to be accessed easily by users without their use of a VPN.

For example, the video compression used by cameras 105 and 106 may be MPEG-4 or H.264, whereas the video format that is viewable natively by most browsers is motion-JPEG. Motion-jpeg requires a much higher data rate for a given video stream than MPEG-4 or H.264, but plays natively on most mobile devices rather than requiring the installation of special viewing software on the mobile device. The Video-Aware Portal would, as one of its many functions, with the assistance of a media server 107, convert live and recorded video from the cameras and recording devices 105 and 106, into motion-jpeg for native use by mobile devices 109 and 110.

The preferred embodiment of the Video-Aware Portal 108 uses the Ubuntu Linux operating system and an Apache web server, the latter for dynamically preparing web pages for users of mobile devices 109 and 110 to access information within the system. Dynamic preparation of web pages is required to customize the presentation of each web page according to the desires of each user and to identify the sources of information being accessed, such as particular WiFi Receiving Devices 101 and 102, and particular cameras and recording devices as 105 and 106. The preferred embodiment of the portal includes a host for a virtual private network such OpenVPN to assist in communications within the system despite changes in IP addresses of the various devices, and firewalls that may be present between different parts of the system.

Figure 2:
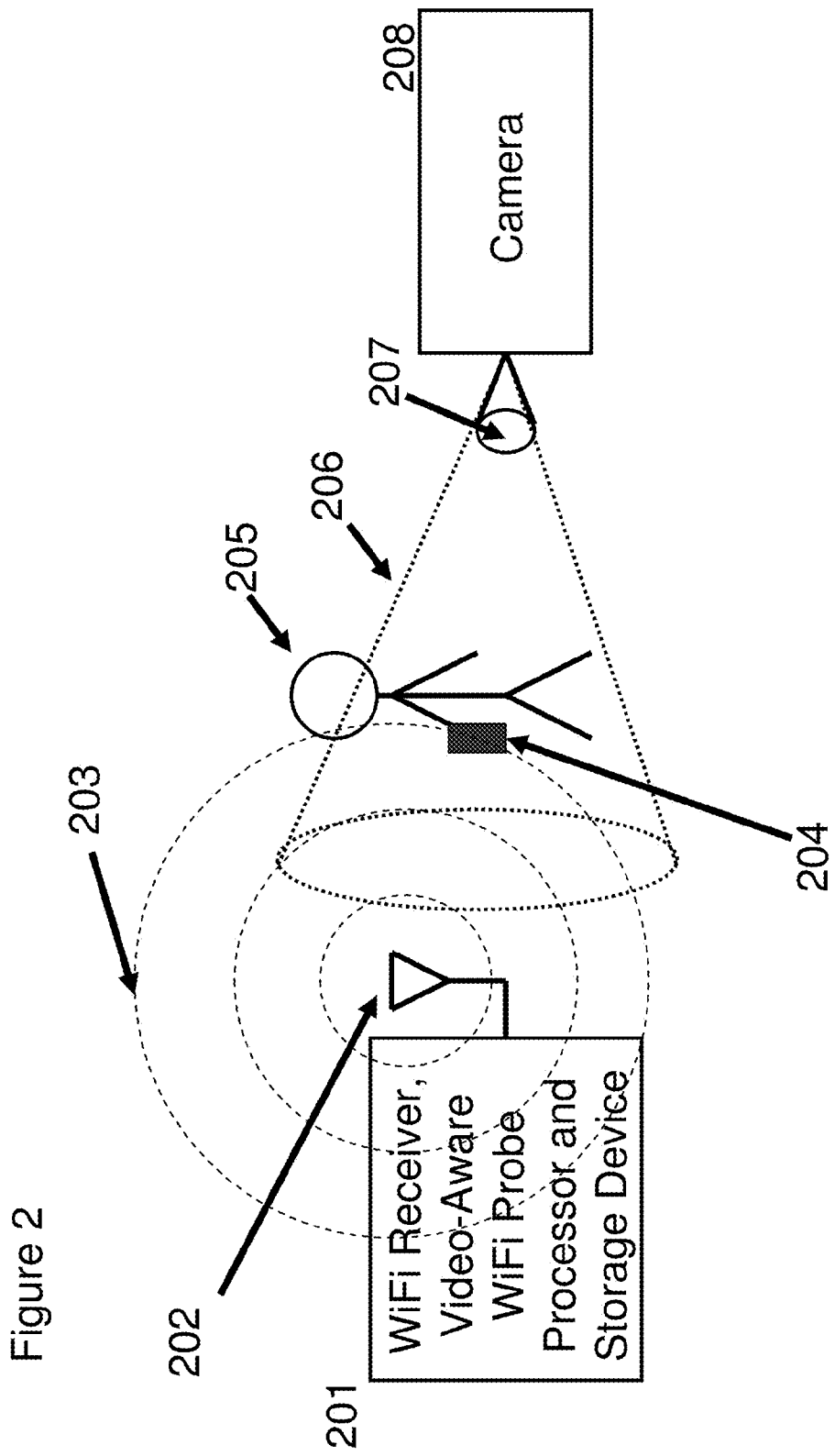
FIG. 2 shows a block diagram showing the receiving area of the WiFi antenna and a camera field of view according to this invention.
Figure 3A:
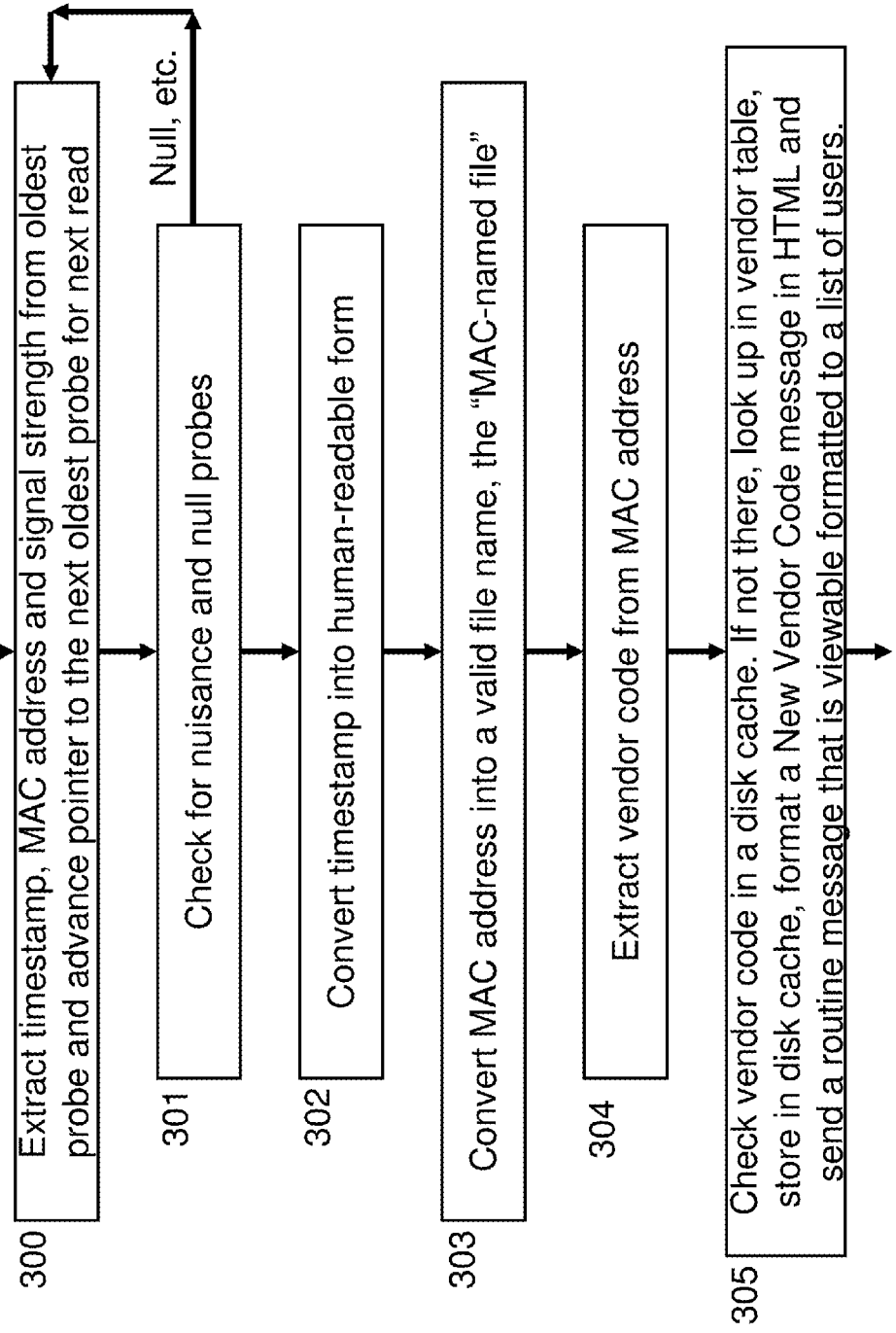
Figure 3B:
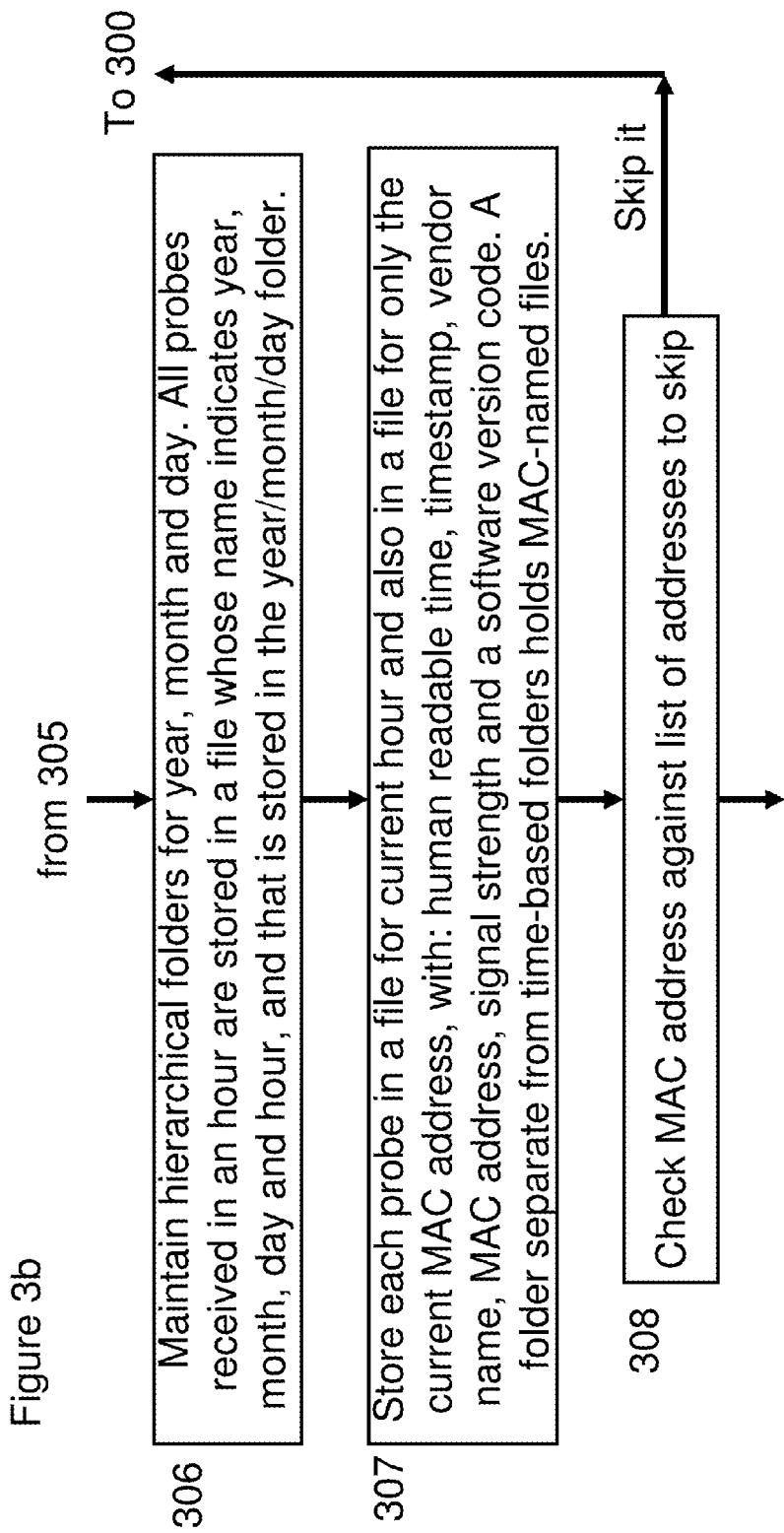
Figure 3D:
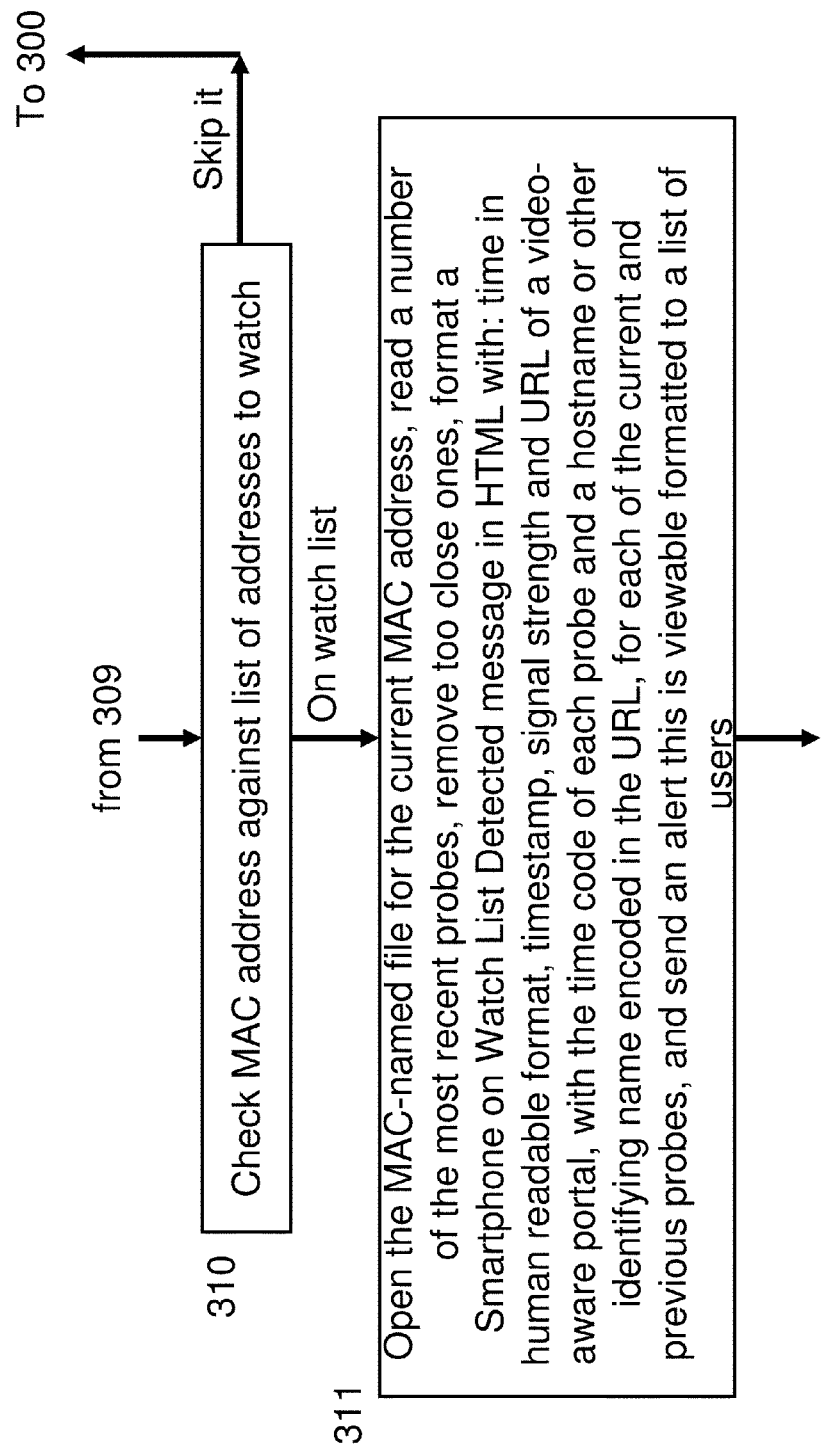
Figure 3E:
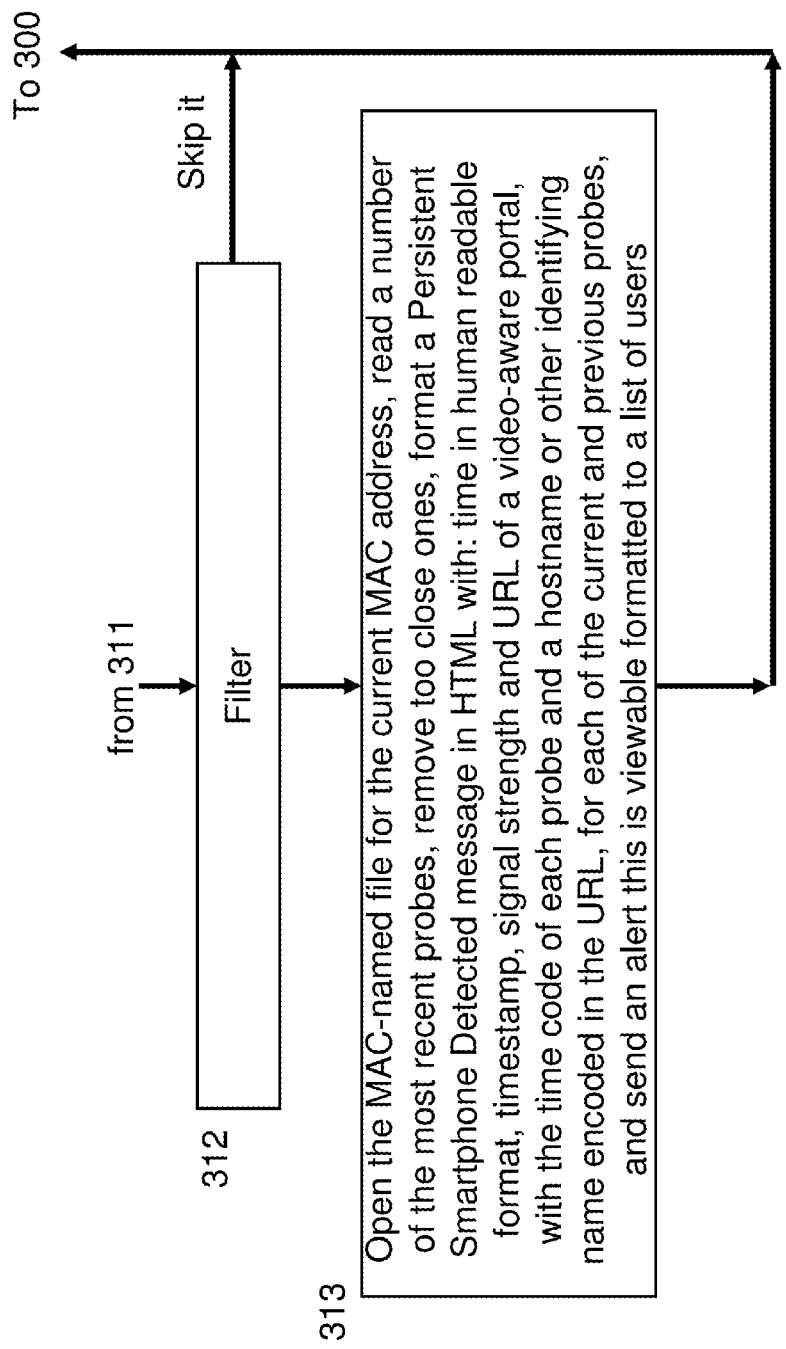

A WiFi Receiving Device, as 101 and shown as 201 in FIG. 2, has an antenna 202 with a receiving field pattern 203 for receiving WiFi probes from mobile devices as 204 carried by persons as 205. Vehicles, objects such as tags, and entertainment devices may also transmit WiFi probes and be received by 201.

A camera, as 105 and shown in part as 208 in FIG. 2, has a lens 207 with a field of view 206. The focal length of the lens 207 can typically be controlled remotely to provide telephoto to wide angle views. The camera 208 is typically mounted on a frame that enables the camera to be panned and tilted remotely to move the field of view of its lens through space.

A subject 205 is ideally in both the field of view 206 of the camera 208, and in the receiving zone 203 of the antenna 202 for the WiFi Receiving Device 201. The more closely the receiving zone 203 of the antenna matches the field of view 206 of the camera, the fewer mobile devices 204 probes are received from and the more easily one can associate the WiFi MAC address of a mobile device with a particular individual. In the preferred embodiment of this invention, a high gain directional antenna is used for the WiFi antenna 202 to limit the field pattern 203, increase sensitivity, and so that the antenna field pattern 203 and optical field of view 206 match one another as much as possible.

FIGS. 3a through 3e give a flowchart of my video-aware, WiFi monitoring program, according to this invention. It is written in Linux bash and runs on the WiFi Receiving Device as 101 and 102 and processes probes as they are received. Other operating systems and programming languages could be used.

Block 300 receives a WiFi stream from tshark, wireshark or other program that receives information from wireless devices using a wireless network interface, and filters that information. The filtering is configured so the stream contains only WiFi probes, not any user data. Block 300 extracts the timecode, MAC address and signal strength from the oldest probe and advances a pointer to the next oldest probe for the next read. In Linux, probes are buffered by the operating system before being presented to a processing function such as 300 to handle probes that are received faster than probes can be processed, and the choice of which probe is processed next is handled by a pointer in the operating system. If the processing is fast enough, and the time between probes is long enough, then there are no unprocessed probes and the oldest probe is the newest probe.

Block 301 checks for nuisance and null probes, and aborts any further processing of them. This is necessary because sometimes probes are received with null MAC addresses, and some devices, particularly AC-powered laptop computers and entertainment devices, send probes at high rates, often one every few seconds.

Block 302 converts the timecode, which contains both date and time, into a human readable form. This is done for ease of comprehension by the user. I use the human readable form, "Mar 8 2013 14:16:08", for example, without a comma between the day and the year so that the value appears as a single record in a spreadsheet.

Block 303 converts the MAC address, which is a text string of the form "01:23:45:67:89:AB", into a form that can be used as a file name in Linux, of the form "01-23-45-67-89-AB" to which I append the suffix ".txt". With the ".txt" suffix, I call this the "MAC-named file." Conversion is done because Linux does not allow the use of colons in file names.

Block 304 extracts the vendor code, which is the first 6 hex characters from the MAC address, i.e., "012345" in the example above. It is looked up in a disk cache of vendor codes so the name of the manufacturer of the mobile device can be reported when possible. If the vendor code is not in the disk cache, a table of vendor codes is searched. If a valid vendor name is found, it is added to the disk cache of vendor codes.

The vendor code is most useful when one wants to visualize the type of mobile device being used to assist in spotting a subject. In addition, knowing the manufacturer enables one to deduce which operating system is used by the mobile device. This is useful to law enforcement when they desire to obtain a court order to compel the provider of the operating system of the mobile device to disclose the name and other information of the owner of a particular mobile device.

When a vendor code is received that is not in the disk cache, a "New Vendor Code" message is prepared and sent to a list of users, typically system administrators who want to monitor the routine operation of the system. Not just a text message, a message is formatted in HTML so it can be viewed with HTML formatting, and it is sent as an e-mail of the MIME (Multipurpose Internet Mail Extensions) type that signifies it has content formatted in HTML. This is indicated in the e-mail by a content type of "text/html". Since HTML must be properly formatted to be displayed properly, text files with HTML code are provided within the WiFi Receiving Device 101 and 102 that specify the header, the first part of the body, and the footer of the message. The body is prepared dynamically by the WiFi Receiving Device using properly formatted HTML.

Every probe is stored twice to enable quickly locating it by time, and assist locating probes with the same MAC address. This provides faster access than storing everything in a DB4 or other data base and searching for relevant entries.

Block 306 creates and maintains hierarchical folders for the storage of files according to time. This assists in locating probes received during certain time periods and minimizes the number of files in a folder. Folders are created as needed for the current year, month and day under a root folder. New files are created as needed for storage in these folders.

Block 307 forms a text record for each probe of the form, where commas separate the fields:

Human readable time, timecode, vendor name if known otherwise blank, MAC address, signal strength (RSSI=received signal strength indicator), and software version code This record is comma-delimited for importing into spreadsheets, hence the human readable time does not include a comma within it. If the vendor name is unknown, a blank field is stored. The software version code is included so the record format can be changed if needed, and backward compatibility maintained by interpreting each record according to the version code of the record.

Block 307 stores all probes received within a particular hour in a text file whose name indicates the year, month, day and hour. I call this text file the "hour" file. It has the ".txt" extension and is stored in the year/month/day/folder. In addition, one or more folders separate from the /year/month/day/folders store the MAC-named files. The latest record is stored at the end of both the MAC-named file and the current hour file. This avoids searching a data base for probes with the same MAC address, which is useful when messages are sent with a list of the most recent probes received. It also shows other probes received around the time of a particular probe.

The Skip List and Watch List are text files containing MAC addresses. They are prepared automatically or upon user request by one or more programs that look for patterns of MAC addresses over time using the data base of stored WiFi probes.

Block 308 checks the MAC address of the probe against the MAC addresses in the Skip List. Processing of the current probe is aborted if the probe is on the list. This list may have thousands of entries. MAC addresses may be on this list because they come from persistent devices, such as entertainment systems and laptop computers in residential neighborhoods, or devices known to be non-threatening, such as from mobile devices used by residents of a neighborhood.

Various conditions can trigger the sending of routine messages, which do not include links to video, and higher priority messages, which I call "alerts" and include links to video via the Video-Aware Portal 108.

Block 309 checks the signal strength of the probe. If it is in a certain range, such as a particularly strong signal that indicates the mobile device was near the WiFi Receiving Device 101, a "Strong Signal Message" is prepared. The header and first part of the body of the message are prepared as described above. The MAC-named file for the current MAC address is opened, a number of the most recent probe records is read, records received too close to one another are deleted, and remaining records are inserted into the body of the message using properly formatted HTML.

In addition, a "video URL" is included for each record. The video URL does not address a video stream but provides a means to obtain it. The video URL includes the IP address and port of the Video-Aware Portal 108 that will process the message and present video and other information to the viewer. The URL also includes two "URL-encoded" parameters, the Linux HOSTNAME of the WiFi Receiving Device to identify the location of the surveillance site, and the time code of the probe. They are necessary so the Video-Aware Portal can choose cameras and recording devices that are relevant to a particular WiFi Receiving Device, and so web pages can be formatted for easily viewing video recorded at the time of previous probes. The URL may also include the IP address and port number of a media server to use for the video that is embedded in the web pages provided by the portal, but the choice of media server can be overridden by the configuration file for a given WiFi Receiving Device.

Block 310 checks the MAC address of the current probe against the MAC addresses in the Watch List. This list may have thousands of entries. If the MAC address is not on the watch list, processing of the current probe is done.

If the current probe is on the Watch List, block 311 prepares an HTML-formatted message with a video URL for each record as described for block 309, but with a Smartphone on Watch List Detected subject line, and sends it to a distribution list. The e-mail is sent with the MIME type that signifies it has content formatted in HTML.

Block 312 is a filter that looks in real time for MAC addresses that have been present in the immediate past for at least a certain period of time. Probes that do not satisfy these criteria are rejected and processing of the current probe is done.

If the current probe satisfies the filter conditions, block 313 prepares an HTML-formatted message with a video URL for each record as described for block 309, but with a different subject line, and sends it to a distribution list. The e-mail is sent with the MIME type that signifies it has content formatted in HTML.

Processing of the current probe is done and the next probe is processed by block 300 as soon as it is available.

Figure 8A:
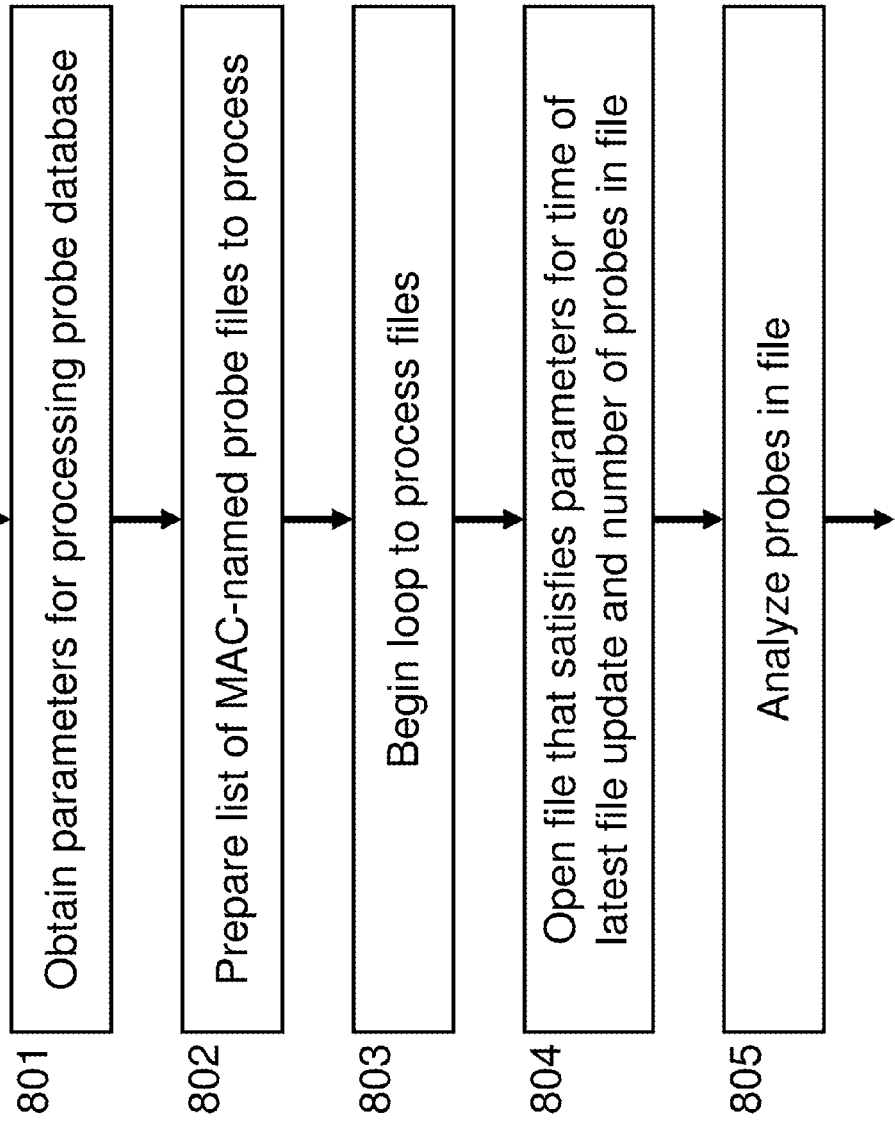
FIG. 8 gives a flowchart of a program that analyzes the data base of stored probes, according to this invention. This program runs on my WiFi Receiving Device as 101 and 102.
Figure 8B:
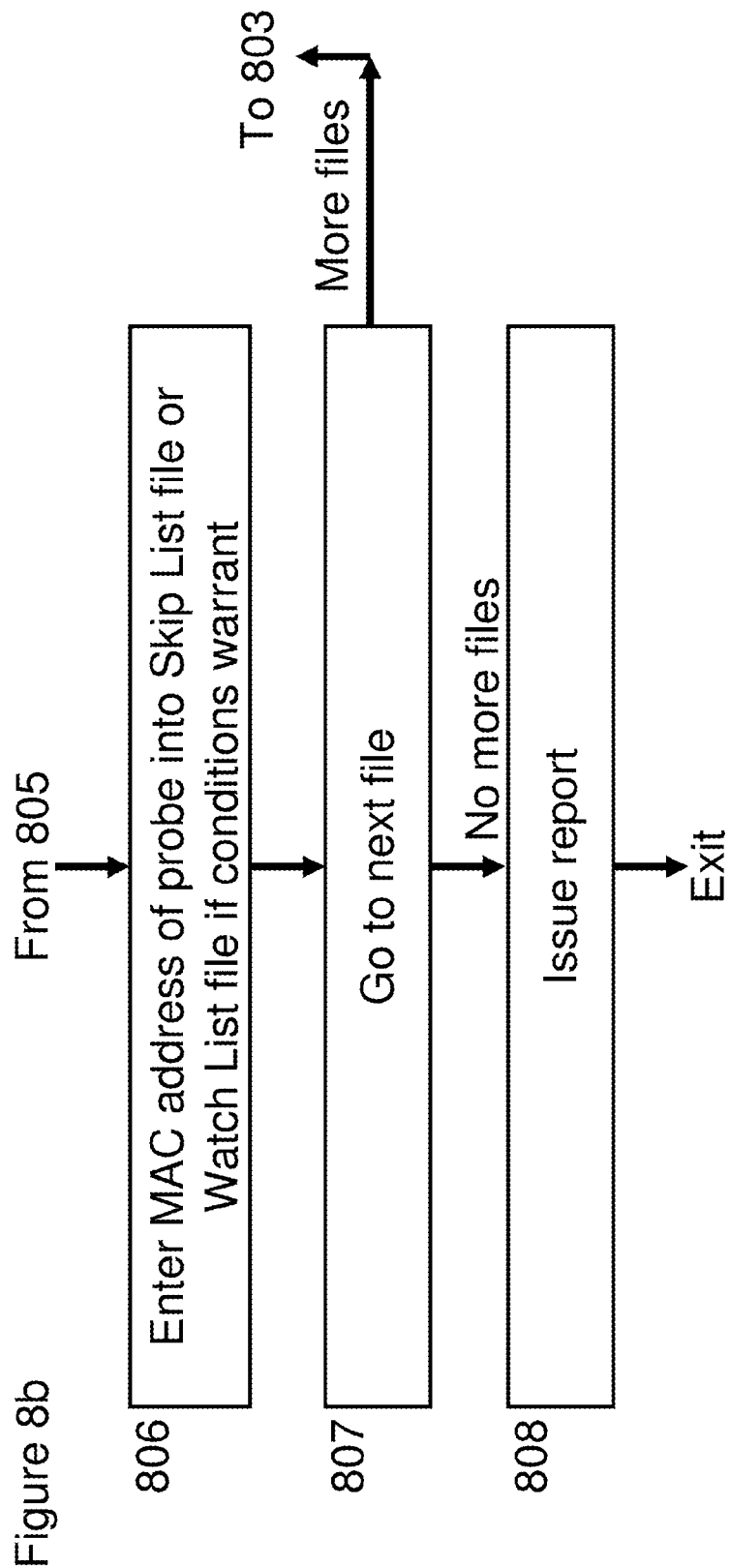

FIG. 8 shows the flowchart for my "Trigger" program that analyzes the data base of stored probes, in particular, the MAC-named files since the activity of each particular mobile device is of interest. This program is written in Linux bash and runs in the WiFi Receiving Device as 101 and 102, periodically or upon user request, concurrently with all other functions. Other operating systems and programming languages could be used. This program enters information into the Skip List and Watch List files used by my video-aware, WiFi monitoring program described above.

The program is controlled by parameters that include beginning and ending times of time period to analyze, minimum number of probes received during that time period to be worth considering, maximum time between probes to consider mobile device present during a particular time period, minimum and maximum signal strengths, minimum and maximum durations required for a given presence to be reported, whether a mobile device should be detected inside or outside a block of time on a given day, and times of day and days of week to analyze.

A "Lingering Filter," for example, may be implemented by analyzing the data base of stored WiFi probes with a set of parameters that identify mobile devices, i.e., their WiFi MAC addresses, whose probes are received during a particular period of time, such as between 8 AM and 5 PM, Monday through Friday, where a mobile device is present for at least a certain period of time but less than a certain period of time, and dropouts in the reception of WiFi probes for a certain period of time are acceptable. This could, for example, be used to detect the presence of the mobile device used by a drug dealer who is known to hang around, i.e., linger, outside a convenience store for between half an hour and an hour and a half, during certain hours on certain days, while ignoring shoppers and delivery personnel who conduct their business in a few minutes, and ignoring workers who are present for several hours. Brief dropouts, such as up to five minutes for example, in the reception of WiFi probes would not invalidate the detection, since dropouts are common as a person moves around and interferes with the transmission of WiFi probes.

Inversely, a "Before and After Filter," may be implemented by analyzing the data base of stored WiFi probes with a set of parameters that identify mobile devices that are present outside of certain times. This is useful for detecting persons who are committing disability insurance fraud and do not want to be detected leaving their home or place of business outside of certain hours on certain days.

As shown in FIG. 8a, the Trigger program receives a request to analyze the probe database. Block 801 obtains parameters that specify how to perform the analysis. Block 802 prepares a list of MAC-named files to process. This list may contain hundreds of thousands of entries when the WiFi Receiving Device as 101 and 102 is near a busy city street.

Block 803 begins a loop to process the files. Block 804 opens a file that satisfies the criteria for time of the period to analyze and the minimum number required probes in the file to be worth analyzing. For example, if one desires to analyze probes received recently, but the file has not been updated recently, then it is not analyzed. Likewise, if one desires to search for times of presence of at least one hour, then a certain minimum file size is implied to contain that many files, and files smaller than that would not have the requisite number of probes and would be ignored.

Block 805 analyzes the probes in the file. The type of analysis that could be performed, and the set or parameters required to specify various patterns of presence, are limited only by one's imagination. When processing of the file is complete, block 806 enters the MAC address of the MAC-named file that was processed into the Skip List file, the Watch List file, or neither, depending upon the results of the analysis.

Block 807 goes on to the next file, returning to block 804 when there are more files to process. When all files have been processed, block 808 sends a report to persons who administer operation of the system, and exits.

FIG. 4 gives a flowchart of the web page formatting program that runs on my Video-Aware Portal 108 according to this invention. This program is written in php and runs on an apache server in the preferred embodiment of the invention. Other programming languages and web servers could be used.

Block 400 receives an HTTP request from a user who clicks on a video URL in a message sent by a WiFi Receiving Device as 101. It extracts the hostname or other code that identifies the WiFi Receiving Device that sent the e-mail that was received by the user, the time code from the URL, and the URL of a media server.

Block 401 opens a configuration file based on the hostname received.

Block 402 reads the chosen configuration file. This configuration file enables web pages to be dynamically formatted with information that is relevant to the WiFi Receiving Device 101 that sent the message. In the preferred embodiment, this information includes the name of the WiFi Receiving Device 101 to be displayed, as a means of identifying the location of the site under surveillance, the number of cameras 105 and 106 that view the area under surveillance by the WiFi Receiving Device, how to access live video from the cameras, how to access video from recording devices for these cameras, whether or not the cameras can be remotely controlled, public or VPN IP addresses for accessing the cameras and controlling devices, and the URLs of media servers, which may be separate from the Video-Aware Portal.

Block 403 dynamically prepares and displays web pages that show live video from the selected camera(s), enables controlling any PTZ (pan-tilt-zoom) movement of the camera(s), enables the user to choose to view live video, recorded video starting a brief period before the time specified in the time code, recorded video from other dates and times, or pages formatted other ways to optimize viewing on devices with different screen sizes and different Internet connection speeds.

Information from the WiFi Receiving Device can also be viewed, such as hour files and MAC-named files, trigger conditions can be set, and e-mail distribution lists edited.

FIG. 5 gives the graphical rendition of an exemplary HTML-formatted e-mail for Smartphone on Watch List Detected, according to this invention. This graphic view is produced by the text in Listing 1.

Header information identifies the type of alert, in this case, a smartphone whose MAC address is on the watch list, and its MAC address as 504. It is followed by a body that tells the user how to access live and recorded video from the camera(s) selected by the Video-Aware Portal for the WiFi Receiving Device that created the message. A list, including items 501 and 502, of the current and most recent probes is provided, each with a link as 503 for viewing.

Figure 6:
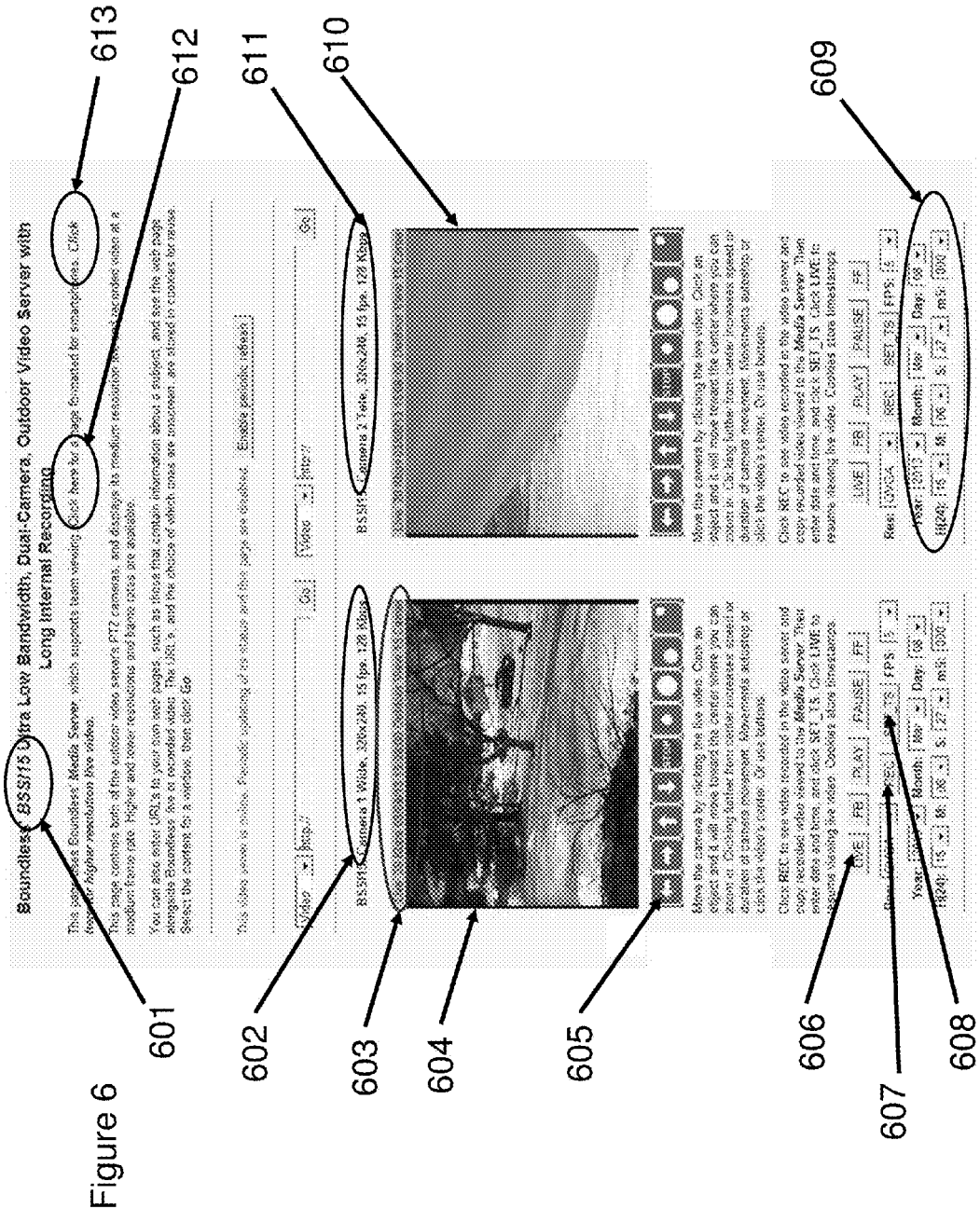
FIG. 6 is a screenshot of an exemplary view from a web browser of live surveillance video, according to this invention. In this example, two cameras view the area monitored by my WiFi Receiving Device as 101 and 102 at a particular location. The page is prepared by my Video-Aware Portal 108, and the video for each camera is provided by my media server 107.

FIG. 6 is a screenshot of an exemplary view from a browser of live surveillance video, according to this invention. In this example, two cameras view the area monitored by my WiFi monitoring program at a particular location.

In this case, a WiFi Receiving Device 101 is combined with two cameras, each with video recording, as 105 and 106, are a single unit whose identity is displayed as BSSI15. This is shown as 601 in the title for the page, enabling one to identify the location of the site under surveillance.

Since this example has two cameras, there are two video windows, 604 and 610. There is a title for each window, as 602 and 611, which gives the name of the camera and information about its video, in this case, the resolution, frame rate and nominal data rate of the video. The video is inserted into the video window in the web page that is provided by the Video-Aware Portal 108 by the media server 107.

A header as 603 for each video window 604 tells whether live or recorded video is being viewed, and if live, the data rate of the video stream so one can assess loading on the wide area network used by the camera whose video is being displayed, and the date and time. For ease of identification, the header text is green when video is live, and red when video is recorded.

If the camera is a PTZ camera instead of a fixed camera, buttons 605 are provided by the Video-Aware Portal under the direction of a configuration file to control it. The camera can also be controlled by clicking on the live video, as described beneath the buttons.

The choice of viewing live video is made by clicking the LIVE button 606, or, if recorded video is desired, by clicking the REC button 607. Live video opens by default by clicking the view link in the alert.

The time code of the probe is passed in the video URL and appears automatically, minus 30 seconds, in the date and time entry fields 609. Recorded video starting at that time can be accessed by pressing the REC button 607 and then the SET_TS (set time stamp) button 608. Since many mobile devices send WiFi probes infrequently, and a person can walk a significant distance in the time between two probes, a number of seconds, in this case, 30, is subtracted from the time code to simplify viewing a short period before the probe was sent by the mobile device.

By clicking view links from multiple probes, and the REC and SET_TS buttons in the pages that open, one can easily view video recorded from multiple cameras at multiple times. Since many persons may be in the field of view 206 of the cameras, and since persons can walk or drive a significant distance between relatively infrequent WiFi probes, this enables one to see the persons associated with a given MAC address at multiple times and assess whether or not a particular MAC address is associated with the same person.

Since some viewers may have small screen viewing devices and others large screen viewing devices, and some viewers may have slow connections to the Internet and others fast connections to the Internet, the preferred embodiment enables viewers to choose live and recorded video streams for viewing that are best suited to their viewing device and Internet connection. These different video streams have varying resolutions, frame rates, compression factors and data rates. The configuration file provides information the video-aware portal 108, which it provides to the media server 107, depending on which web page the viewer chooses.

Clicking the link 612 provides a web page that is best suited for viewing a single camera on a smartphone, which has a small screen. Clicking the link 613 provides a web page that is best suited for viewing on medium size devices, such as tablets, and large screen devices such as laptop and desktop computers. The live and recorded video streams chosen in the web page shown in FIG. 6, and obtained by clicking the link 612, provide medium resolution video. The live and recorded video streams chosen by clicking the link 613 provide higher resolution video.

Figure 7:
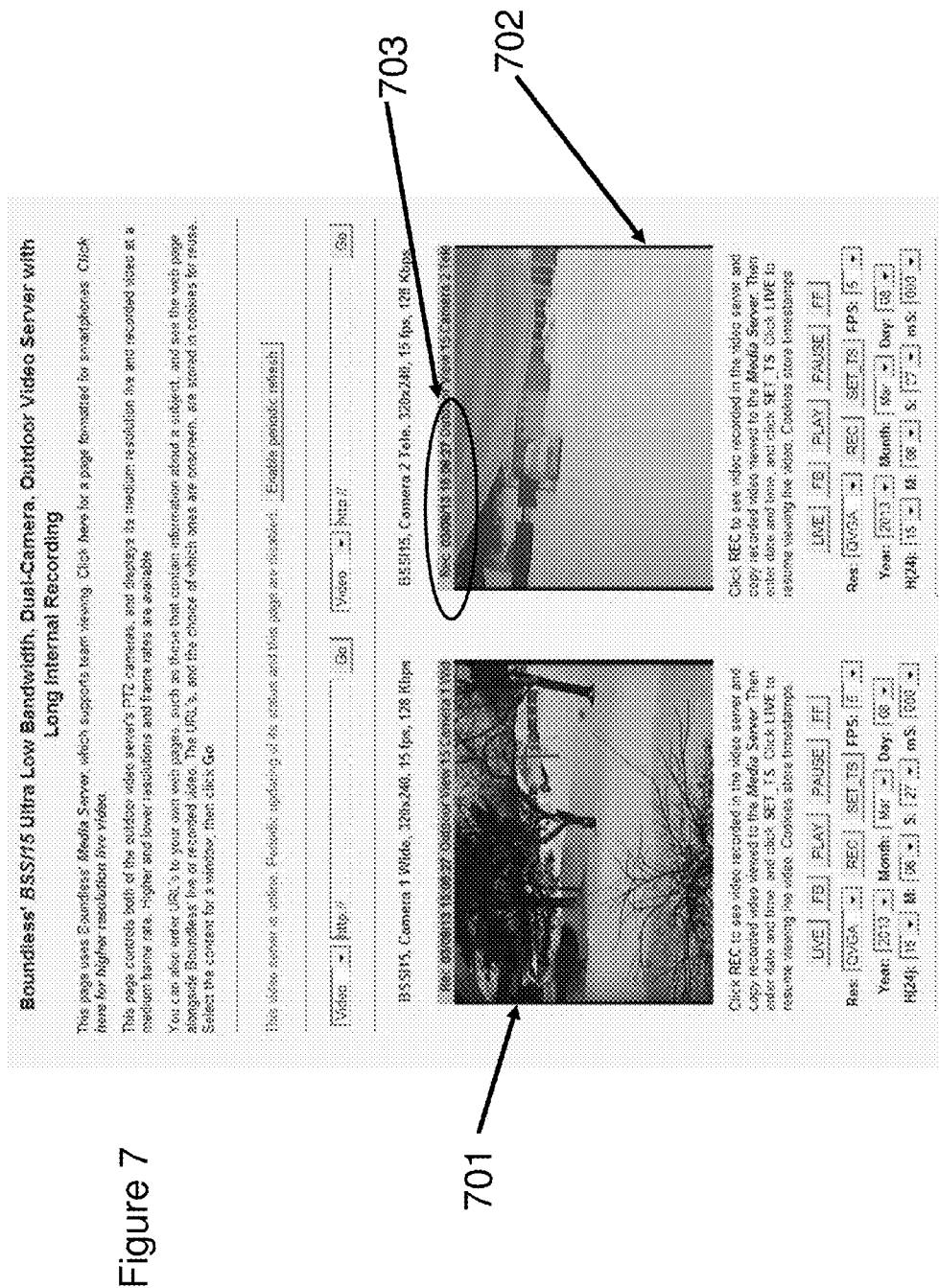
FIG. 7 is a screenshot of an exemplary view from a web browser of recorded surveillance video, according to this invention. In this example, two cameras view the area monitored by my WiFi Receiving Device as 101 and 102 at a particular location. The page is prepared by my Video-Aware Portal 108, and the video for each camera is provided by my media server 107.

FIG. 7 is a screenshot of an exemplary view from a browser of recorded surveillance video, according to this invention. In this example, two cameras view the area monitored by my WiFi monitoring program at a particular location. This page is the same one shown in FIG. 6, the only difference is that the REC and SET_TS buttons have been clicked for both cameras, causing recorded video to be displayed instead of live video, and from the time code, minus 30 seconds, given in the view link.

Two video windows are shown as 701, which is the same as 604, and 702, which is the same as 610. The time shown above the video window 703 is that of the time code in the buttons, and the video is shown as being REC (recorded) instead of Live. No buttons for controlling the PTZ movement of the cameras are shown because cameras can only be controlled when viewing live video.

Listing 1 gives the text of the exemplary HTML code prepared by my video-aware, WiFi monitoring program whose flowchart is shown in FIG. 2 when a smartphone on the watch list is detected, according to this invention. This code produced the graphical rendering shown in FIG. 5, with the exception that the actual IP addresses and port numbers have been replaced by generic ones.

Starting at line 35 in Listing 1 is the following HTML code, which is similar to the code produced for the other probes listed, varying only in the human-readable time and the timestamp:

<P>Probe received at Mar 8 2013 15:06:57 with signal strength −79 dBm <A href="http://<ipaddress:port>/production/index_widescreen.php?URL-http %3A%2F %2F<ipaddress:port>%2F&userName=W-1&amp; timestamp=1362773217">view</A></P>

This provides (I have placed single quotes around strings of characters):

'<P>' which marks the beginning of a paragraph

'Probe received at Mar 8 2013 15:06:57 with signal strength −79 dBm' which provides the human readable time of the probe, and its signal strength '<A href=' which begins the anchor for the video URL '"http://<ipaddress:port>/production/index_widescreen. php' which gives the protocol, IP address and port number of the video aware portal, followed by the folder name and program to use to present video to the user; the flowchart for this program is given in FIG. 4; these parameters would change depending on IP addresses, port numbers, and folder and file names used '?URL=http%3A%2F%2F<ipaddress:port>%2F&userName=W-1&amp;timestamp=1362773217">' which gives the URL-encoded parameters including the protocol, IP address and port of a media server that provides the video, identification of the WiFi Receiving Device (userName=W-1) that sent the alert, and the time code (timestamp=1362773217) in Linux epoch time of the probe, and completes the href body 'view</A></P>' which provides the view link text, marks the end of the anchor for the href and ends the paragraph This provides the flexibility to select appropriate Video-Aware Portals for processing the HTTP requests for video pages, and to select the media server for the video. The configuration file for each WiFi receiver can also override the choice of media server and specify another one. The URL of the media server that is contained within the URL is specially coded according to the rules of HTML and embedded URLs, giving rise to %3A%2F%2F, which is equivalent to '://', and similar constructs.

Note that the time shown in 609 in FIG. 6 is 30 seconds earlier than the time code. The Video-Aware Portal subtracts a number of seconds, in this case, 30, from the time code so that recorded video starting shortly before the time of the probe can be viewed. This is because many mobile devices send relatively infrequent probes, enabling a person to move out of view of a camera by the time a probe is received.

Practitioners will appreciate that many modifications to the exemplary embodiment are possible without departing from the spirit and scope of the invention. In addition, it is possible to use some of the features of the invention without use of all of the features.

Methods for Using the System

Methods for spotting subjects and patterns of presence of subjects, according to this invention, are:

1) You want to know if anyone frequents an area.

This is the default mode of operation. It is useful when you are trying to find suspects for recurring crimes in a particular area.

My WiFi Receiving Device as 101 and 102 builds a history of WiFi probes it captures, not including nuisance probes. Filters periodically review those probes, enters certain MAC addresses into a Skip List to be ignored, and some into a Watch List to be monitored. Residents' smartphones, and too-frequent detection, are automatically filtered out. When a WiFi probe is received whose MAC address is on the Watch List, an alert is sent so live video, and internally recorded video starting a brief period before the time of each of the ten most recent probes, can be viewed in a browser.

Rather than having to view hours of recorded video trying to spot patterns, the user can view short segments of video recorded in, and identified by, the system to see which vehicles and persons frequent the area under surveillance. The user can then associate a person or vehicle with a particular WiFi MAC address and vice-versa.

2) You want to watch for specific individuals or vehicles.

This is useful when you want to be alerted in real time when someone shows up. This is particularly useful in towns that limit gang members from associating with other gang members.

Once you know individuals' or vehicles' mobile devices' WiFi MAC addresses, you can enter them into the Watch List or Skip List in the WiFi Receiving Device. The WiFi Receiving Device sends a video-aware alert within seconds of its detecting a signature on its Watch List.

3) You want to know when someone lingers.

This is useful when a subject's home or business is near a busy road, and you want to be alerted when someone stops to visit or make a delivery.

There are two ways to do this.

As WiFi probes are received, the WiFi Receiving Device measures how long each MAC address that is not persistent or on the Skip List is present, and can send an alert when the duration exceeds a threshold. A steady stream of vehicles on the busy road is ignored since they are not present long enough.

You use the Lingering Filter to analyze recorded probes to find a range of durations of presence over a certain range of dates and times. You view recorded video to look for past subjects, and you enter the MAC addresses into the Watch List so you can receive a video-aware alert when the subject appears in the future.

4) You want to associate an individual or vehicle with a particular smartphone WiFi signature.

If you know a WiFi MAC address, you can open its corresponding MAC-named file and get a list of the times that MAC address was detected. You can view the recorded video at the times of each of those probes, and use it to visually identify a person or vehicle.

5) You want to know who was in an area at a particular time.

This is useful when you are trying to find suspects for previous crimes.

You view the hour files recorded by a WiFi Receiving Device over a desired time period that was operating in an area of interest, and get a list of the WiFi MAC addresses that were observed during that time. You view recorded video starting briefly before the time of each probe to spot suspects.

6) You want to know if anyone was in an area at a number of particular times.

This is useful if there are recurring crimes in the area under surveillance, and you want to know if anyone was present during those crimes. This is another use for the Lingering Filter, which analyzes recorded probes.

You specify the time period during which you want to know if a particular mobile device was present, and you specify a range of durations of presence for each time. You get a list of MAC addresses that were detected during those time periods and for that range of durations, and identifying each time period when it was present. You view the recorded video from those times.

7) You want to know if someone was with someone.

One example of the use of this is when vehicle carries the seller, and a second vehicle carries the buyer, or when a buyer meets a seller.

You determine the times when a subject was present. You then view the WiFi Receiving Devices' hour files for those times to get a list of all WiFi MAC addresses detected during those times. You view the corresponding MAC-named files to see when those devices were present. You view the recorded video to confirm which persons and vehicles were present.

8) You want to know if anyone has visited multiple sensitive areas.

This is useful when you are looking for suspects for recurring crimes such as arson, or terrorists who have visited multiple sensitive areas. This is another use of the Lingering Filter.

You place WiFi Receiving Devices and cameras in those areas where you want to watch for suspects. You then use the Lingering Filter to analyze recorded WiFi probes, and specify multiple time periods during which you want to know if a particular smartphone was present previously. You get a list of WiFi MAC addresses that were detected during those time periods, for the range of durations specified, identifying each time period when it was present. You view the recorded video from those times to confirm the presence of an individual.

9) Determining the MAC address of a mobile device in a confined area

A WiFi Receiving Device with or without cameras and recording devices can be placed in confined spaces, such as lobbies, interview rooms, booking desks, near time clocks, and in other locations where persons' identities are known, because they are obliged to disclose them, and the time of their presence is known. A low gain antenna is used to limit reception range. MAC addresses obtained can be entered into the Skip List or Watch List of one or more WiFi Receiving Devices to watch for the presence of these individuals.

10) You want to learn the identity of the owner of a particular mobile device

The vendor code in a MAC address identifies the manufacturer of the device. Often, it is a 825 contract assembly company. Most devices use an operating system from either Google (Android devices) or Apple, and the choice of operating system depends on the device's manufacturer. Law enforcement personnel can obtain a court order to compel the operating system vendor to disclose information about the owner of a particular mobile device. For law enforcement to obtain the court order, probable cause must be shown. Since a mobile device can be handed from one person to another, one must attach a personal identity, such as provided by a series of images, to a particular mobile device. And, it is helpful if law enforcement can demonstrate that a particular person participated in illegal activity, such as selling drugs. This is provided by a tight coupling between monitoring of WiFi probes, and recording of images, over time.

PATENT CITATIONS

None.

NON-PATENT CITATIONS

1) *New Wi-Fi Pitch: Tracker, Network Developers Offer Retailers Ways to Keep Tabs on Customers as They Shop*, by Anton Troianovski, The Wall Street Journal, Jun. 19, 2012, http://online.wsj.com/news/articles/SB10001424052702303379204577474961075248008

2) *How stores spy on you, Many retailers are snooping more than ever*, ShopSmart: March 2013, http://www.consumerreports.org/cro/2013/03/how-stores-spy-on-you/index.htm 3) *4 Ways Retail Stores Are Monitoring Your Every Move*, Consumerist, by Chris Morran, Mar. 27, 2013, http://consumerist.com/2013/03/27/4-ways-retail-stores-are-monitoring-your-every-move/
4) *How Nordstrom Uses WiFi To Spy On Shoppers*, Forbes magazine, by Peter Cohan, May 9, 2013, http://www.forbes.com/sites/petercohan/2013/05/09/how-nordstrom-and-home-depot-use-wifi-to-spy-on-shoppers/
5) *DIY stalker boxes spy on Wi-Fi users cheaply and with maximum creep value, CreepyDOL follows you around town, vacuums up wireless digital crumbs*, ARS Technica, by Dan Goodin—Aug. 8, 2013, 3:58 pm EDT, http://arstechnica.com/security/2013/08/diy-stalker-boxes-spy-on-wi-fi-users-cheaply-and-with-maximum-creep-value/

I claim:

1. A method for determining the presence of subjects who have visited an area at least once but do not assist in the determination of their presence other than by carrying a mobile device emitting wireless probes, comprising these steps:
   a) specifying a minimum time duration and a maximum time duration for which a subject is expected to be present;
   b) specifying a threshold as the maximum amount of time that can pass between the reception of successive wireless probes from any particular mobile device, or after the time of the last probe, before the presence of the mobile device is considered terminated;
   c) providing at least one receiving device in the area capable of acquiring and recording wireless probes from mobile devices in the area;
   d) storing information about wireless probes in the receiving device, said information including the MAC address in each probe and the time of reception by the receiving device of each probe;
   e) analyzing the recorded wireless probes for each MAC address, determining when the mobile device that produced those wireless probes was present for at least a minimum period of time and not more than a maximum period of time, where a given presence is considered ended when the time between successive probes exceeds a threshold or the time since the last probe exceeds the threshold, and producing a list of those MAC addresses that satisfied a criteria, and for each of those MAC addresses, a list of times of presence when the criteria were satisfied.

2. A method as described in claim 1, additionally comprising:
   a) at least one device in the area capable of acquiring and recording images of the area;
   b) viewing the recorded video for MAC addresses that satisfied the criteria, during the times specified in the list for those MAC addresses, and visually determining whether or not the same subject was present during the times of presence for a given MAC address.

3. A method as described in claim 2, additionally comprising:
   a) causing the device receiving wireless probes to send a message when it receives a wireless probe with any of the MAC addresses for which the bearer of a mobile device has been verified.

4. A method as described in claim 3, additionally comprising:
   a) viewing live video when a message is received in response to the return of a subject to confirm the mobile device bearing the MAC address is borne by the same subject seen earlier in the recorded video.

5. A method as described in claim 3, additionally comprising:
   a) viewing recorded video when a message is received in response to a given presence being considered ended, where viewing of said recorded video begins at the time of reception by the receiving device of the last probe for said presence.

6. A method as described in claim 2 where information stored about each probe received is organized according to the MAC address in each probe.

7. A method for determining the presence of subjects who have visited multiple areas but do not assist in the determination of their, presence other than by carrying a mobile device emitting wireless probes, comprising these steps:
   a) specifying a minimum time duration and a maximum time duration for which a subject is expected to be present;
   b) specifying a threshold as the maximum amount of time that can pass between the reception of successive wireless probes from any particular mobile device, or after the time of the last probe, before the presence of the mobile device is considered terminated;
   c) providing at least one receiving device in each area, said receiving device capable of acquiring and recording wireless probes from mobile devices in the area;
   d) storing information about wireless probes in each receiving device, said information including the MAC address in each probe and the time of reception by the receiving device of each probe;
   e) analyzing the recorded wireless probes for each MAC address from multiple areas, determining when the mobile device that produced those wireless probes was present for at least a minimum period of time and not more than a maximum period of time, where a given presence is considered ended when the time between successive probes exceeds a threshold or the time since the last probe exceeds the threshold, and producing a list of those MAC addresses that satisfied a criteria, and for each of those MAC addresses, a list of times of presence when the criteria were satisfied.

8. A method as described in claim 7, additionally comprising:
   a) at least one device in each area capable of acquiring and recording images of the area;
   b) viewing the recorded video for MAC addresses that satisfied the criteria, during the times specified in the list for those MAC addresses, and visually determining whether or not the same subject was present during the times of presence for a given MAC address.

9. A method as described in claim 8, additionally comprising:
   a) causing a device receiving wireless probes to send a message when it receives a wireless probe with any of the MAC addresses for which the hearer of a mobile device has been verified.

10. A method as described in claim 9, additionally comprising:
    a) viewing live video when a message is received in response to the return of a subject to confirm the mobile device bearing the MAC address is borne by the same subject seen earlier in the recorded video.

* * * * *